(12) United States Patent
Aldahwi (10) Patent No.: US 12,386,945 B1
(45) Date of Patent: Aug. 12, 2025

(54) VERIFICATION AND AUTHENTICATION OF ROBOTS

(71) Applicant: Samara Aldahwi, Los Angeles, CA (US)

(72) Inventor: Samara Aldahwi, Los Angeles, CA (US)

( * ) Notice: Subject to any disclaimer, the term of this patent is extended or adjusted under 35 U.S.C. 154(b) by 0 days.

(21) Appl. No.: 19/069,724

(22) Filed: Mar. 4, 2025

(51) Int. Cl.
G06F 21/00 (2013.01)
G06F 21/44 (2013.01)

(52) U.S. Cl.
CPC ................... G06F 21/44 (2013.01)

(58) Field of Classification Search
CPC ........................................ G06F 21/44
See application file for complete search history.

(56) References Cited

U.S. PATENT DOCUMENTS

| | | | | |
|---|---|---|---|---|
| 6,505,097 B1* | 1/2003 | Fujita | ................ | G05B 19/0426 700/250 |
| 11,367,299 B1* | 6/2022 | Park | ................ | G06V 40/13 |
| 2017/0286708 A1* | 10/2017 | Erhart | ................ | G06F 21/56 |
| 2018/0033244 A1* | 2/2018 | Northrup | ........... | G06Q 30/0238 |
| 2018/0161982 A1* | 6/2018 | Bugenhagen | ........... | G06F 16/00 |
| 2021/0278816 A1* | 9/2021 | Schweiker | ............. | G06F 13/12 |
| 2022/0135154 A1* | 5/2022 | Ueno | ................ | B60Q 9/00 702/34 |
| 2023/0366702 A1* | 11/2023 | Pirkl | ................ | G01D 5/2454 |

* cited by examiner

*Primary Examiner* — Rodman Alexander Mahmoudi
(74) *Attorney, Agent, or Firm* — IP CONSULTING GROUP; Michael Razavi; Alfred F. Hoyte, Jr.

(57) ABSTRACT

A system for verification and authentication of robots is disclosed. The system receives first identification information associated with a metallic identifier of a robot. The system further queries set of databases about the first identification information based on the reception of the first identification information. The system further generates a result based on the querying of the set of databases about the first identification information. The result is indicative of a presence of the first identification information in the set of databases. The system further retrieves regulation data associated with a geographical region based on the generated result. The system further controls an access of the robot to enter the geographical region and to perform one or more actions within the geographical region based on the retrieved regulation data.

19 Claims, 6 Drawing Sheets

VERIFICATION AND AUTHENTICATION OF ROBOTS

FIELD OF TECHNOLOGY

The present disclosure relates generally to robots, and more specifically to a system and method for the verification and authentication of robots.

BACKGROUND

As robotic technology continues to advance, robots are increasingly designed to closely resemble humans, both in appearance and behavior. Such robots are generally referred to as humanoids, which are now capable of mimicking human expressions, movements, and interactions. While these developments offer significant benefits in fields such as healthcare, customer service, and education, they also present new challenges related to the identification, verification, and authentication of robots.

One critical concern arises from the difficulty in distinguishing between humans and humanoid robots. In scenarios where robots interact with humans or operate in public spaces, it is essential to have robust mechanisms to verify and authenticate the identity and purpose of the robots. This is particularly important to prevent misuse or unauthorized actions by robots designed to deceive or manipulate.

Moreover, as robots are deployed across various geographical regions, they may encounter regulatory, security, and privacy restrictions specific to those areas. For example, certain regions may impose strict access controls on robots based on their intended functions, ownership, or compliance with local laws. Therefore, a system is needed to verify whether a robot should be granted access to a particular geographical region or restricted from entering the particular geographical region.

Additionally, the concept of robots traveling alongside humans as companions introduces new dimensions to these challenges. Robots designed to accompany humans on their travels may need to demonstrate compliance with travel-specific regulations, customs, and security protocols. For instance, such robots might require authentication mechanisms to ensure they are authorized companions of the human travelers they accompany, particularly during cross-border movements. Addressing these aspects is critical to facilitating seamless and secure integration of robots as travel companions in both domestic and international contexts.

BRIEF SUMMARY OF THE DISCLOSURE

Systems and/or methods are provided for verification and authentication of robots, substantially as shown in and/or described in connection with at least one of the figures, as set forth more completely in the claims.

In accordance with an embodiment, there is provided a system for verification and authentication of robots. The system may be configured to receive first identification information associated with a metallic identifier of a robot. The system may be further configured to query set of databases about the first identification information based on the reception of the first identification information. The system may be further configured to generate a result based on the querying of the set of databases about the first identification information. The result is indicative of a presence of the first identification information in the set of databases. The system may be further configured to retrieve regulation data associated with a geographical region based on the generated result. The system may be further configured to control an access of the robot to enter the geographical region and to perform one or more actions within the geographical region based on the retrieved regulation data.

In accordance with an embodiment, the metallic identifier corresponds to a fingerprint of the robot. The fingerprint is made up of a metal.

In accordance with an embodiment, the first identification information corresponds to a digital code associated with the metallic identifier.

In accordance with an embodiment, the metallic identifier is indicative of at least one of: a manufacturer of the robot, an owner of the robot, or a citizenship of the robot.

In accordance with an embodiment, the system may be further configured to retrieve the regulation data, from the set of databases, associated with the geographical region based on the generated result. The system may be further configured to control the one or more actions of the robot based on the retrieved regulation data.

In accordance with an embodiment, the system may be further configured to detect one or more restricted actions performed by the robot within the geographical region. The one or more actions includes the one or more restricted actions. The system may be further configured to restrict one or more operations of the robot based on the detection of the one or more restricted actions performed by the robot within the geographical region. The system may be further configured to transmit a notification to an electronic device based on the restriction of the one or more operations of the robot.

In accordance with an embodiment, the system may be further configured to receive an input associated with a transfer of an ownership of the robot from a first entity to a second entity. The system may be further configured to modify the first identification information based on the reception of the user input. The system may be further configured to update the first identification information associated with the metallic identifier of the robot in the set of databases based on the modification of the first identification information.

In accordance with an embodiment, the control of the access of the robot corresponds to one of: allowing the robot to enter the geographical region or restricting the robot from entering the geographical region.

In accordance with an embodiment, the system may be further configured to compare the first identification information with second identification information associated with the metallic identifier of the robot. The system may be further configured to determine the first identification information is different from the second identification. The system may be further configured to trigger a fail-safe mode within the robot based on the determination that the first identification information is different from the second identification.

In accordance with an embodiment, the system may be further configured to control, a blood detection device, to identify an entity as the robot. The blood detection device is configured to detect one of a presence or an absence of the blood within the entity. The system may be further configured to receive the first identification information associated with the metallic identifier identified robot.

In accordance with an embodiment, the first identification information is associated with each part of a set of parts associated with the robot.

In accordance with an embodiment, a global positioning sensor (GPS) is integrated with each part of a set of parts associated with the robot.

In accordance with an embodiment, a unique identifier is associated with the robot.

In accordance with an embodiment, there is provided a method for verification and authentication of robots. The method includes receiving first identification information associated with a metallic identifier of a robot. The method further includes querying set of databases about the first identification information based on the reception of the first identification information. The method further includes generating a result based on the querying of the set of databases about the first identification information. The result is indicative of a presence of the first identification information in the set of databases. The method further includes retrieving regulation data associated with a geographical region based on the generated result. The method further includes controlling an access of the robot to enter the geographical region and to perform one or more actions within the geographical region based on the retrieved regulation data.

In accordance with an embodiment, the metallic identifier corresponds to a fingerprint of the robot. The fingerprint is made up of a metal.

In accordance with an embodiment, the first identification information corresponds to a digital code associated with the metallic identifier.

In accordance with an embodiment, the metallic identifier is indicative of at least one of: a manufacturer of the robot, an owner of the robot, or a citizenship of the robot.

In accordance with an embodiment, the method further includes retrieving, from the set of databases, regulation data associated with the geographical region based on the generated result. The method further includes controlling the one or more actions of the robot based on the retrieved regulation data.

In accordance with an embodiment, the method further includes detecting one or more restricted actions performed by the robot within the geographical region. The one or more actions includes the one or more restricted actions. The method further includes restricting one or more operations of the robot based on the detection of the one or more restricted actions performed by the robot within the geographical region. The method further includes transmitting a notification to an electronic device based on the restriction of the one or more operations of the robot.

In accordance with an embodiment, the method further includes receiving an input associated with a transfer of an ownership of the robot from a first entity to a second entity. The method further includes modifying the first identification information based on the reception of the user input. The method further includes updating the first identification information associated with the metallic identifier of the robot in the set of databases based on the modification of the first identification information.

In accordance with an embodiment, the control of the access of the robot corresponds to one of: allowing the robot to enter the geographical region or restricting the robot from entering the geographical region.

In accordance with an embodiment, the method further includes comparing the first identification information with second identification information associated with the metallic identifier of the robot. The method further includes determining the first identification information is different from the second identification. The method further includes triggering a fail-safe mode within the robot based on the determination that the first identification information is different from the second identification.

In accordance with an embodiment, there is provided a non-transitory computer-readable medium including computer program instructions, which when executed by a system, cause the system to perform one or more operations for verification and authentication of robots. The one or more operations include receiving first identification information associated with a metallic identifier of a robot. The one or more operations include querying set of databases about the first identification information based on the reception of the first identification information. The one or more operations include generating a result based on the querying of the set of databases about the first identification information. The result is indicative of a presence of the first identification information in the set of databases. The one or more operations further include retrieving regulation data associated with a geographical region based on the generated result. The one or more operations further include controlling an access of the robot to enter the geographical region and to perform one or more actions within the geographical region based on the retrieved regulation data.

In accordance with an embodiment, the metallic identifier corresponds to a fingerprint of the robot, wherein the first identification information corresponds to a digital code associated with the metallic identifier.

The disclosed system (also referred to as a digital passport system or a Pass Bot system) for robots offers numerous advantages by addressing key challenges associated with robot verification and authentication. One significant benefit is enhanced identification and authentication, ensuring the authenticity of the robot and preventing impersonation, particularly for humanoid robots that closely resemble humans. The disclosed system facilitates regulatory compliance by incorporating essential credentials, such as ownership details, and adherence to region-specific laws. Such features streamline verification processes and ensure robots meet the necessary standards before operation in a given geographical region.

The digital passport also enables robust access control management, allowing robots to be granted or restricted access to specific geographical regions based on predefined permissions. This ensures enhanced security by mitigating risks associated with unauthorized or malicious robot activities. Additionally, the system includes real-time monitoring capabilities, enabling continuous updates on a robot's status, location, and operational activities, further strengthening security and operational oversight.

Security is a cornerstone of the digital passport system, which employs advanced encryption and tamper-proof mechanisms to safeguard sensitive data. These measures ensure that the information within the digital passport remains secure and cannot be altered or accessed by unauthorized parties. Furthermore, interoperability is a key feature, as the digital passport can integrate with existing identification systems, international registries, and regional databases, allowing seamless robot deployment and operations across multiple jurisdictions without redundant verification processes.

End-users, including organizations and regulatory bodies, benefit from increased transparency and accountability, as the digital passport provides a comprehensive and easily accessible record of the robot's purpose, ownership, and compliance status. This fosters public trust in robotic systems and ensures a safe and reliable integration of robots into human environments. By addressing these critical issues, the digital passport system lays a strong foundation for the responsible and secure deployment of robots in diverse applications worldwide.

Moreover, the robots may be provided with citizenship similar to their owner's citizenship. Also, robots may be given rights (like the humans). The robots may have to apply for a "bot-visa" which will be easier to get than getting a visa for humans. This can help the economy of many countries. For example, certain countries may have strict visa approval processes that make it difficult for individuals to travel and conduct business abroad. However, these countries may still have a demand for exported goods, such as cars that have been totaled by insurance. To facilitate the trade, they require someone from another country to handle the logistics-securing the container, completing the paperwork, and selecting the cars. While a person from these countries might face challenges in obtaining a visa due to immigration concerns, a robot wouldn't face the same barriers. The robot could apply for an e-visa online, travel without a human owner, handle the necessary tasks, and then return to its home country, effectively bypassing the visa restrictions.

Also, the disclosed system introduces new opportunities in global commerce, trade, and diplomatic relations. With the ability to travel, purchase international goods, and engage in business transactions, robots may become valuable assets in international trade, negotiations, and business expansion efforts. In countries where some citizens face visa restrictions or travel limitations, registered robots could act as proxies, facilitating trade and global interactions without the need for human presence. This would allow individuals and businesses to overcome travel barriers, enabling seamless global participation in commerce, education, and diplomatic discussions.

By legally recognizing robots as extensions of their human owners, this disclosed system significantly enhances economic growth, global connectivity, and diplomatic cooperation, while also ensuring that international regulations and security measures remain in place to prevent unauthorized movements or potential misuse of robotic technology.

DETAILED DESCRIPTION OF THE DISCLOSURE

Various aspects of the disclosure may be found in a method and system for verification and authentication of robots. Advancements in robotic technology have led to robots, especially humanoid robots, closely resembling humans in appearance and behavior. These robots can mimic human expressions, movements, and interactions, providing significant benefits in fields like healthcare, customer service, and education. However, these advancements present challenges in identifying, verifying, and authenticating robots to distinguish them from humans and ensure their proper use.

Key concerns include the potential misuse of robots that closely mimic humans and the need for robust systems to verify their identity and purpose, particularly in public spaces. Additionally, as robots operate across different regions, they encounter diverse regulatory, security, and privacy restrictions. A system is required to manage robot's access to specific regions based on predefined criteria, ensuring compliance with local laws. Effective verification and authentication systems are essential for safety, security, and seamless integration of robots into human environments, mitigating risks associated with unauthorized or inappropriate use.

The digital passport system for robots addresses critical challenges in verification and authentication. It ensures enhanced identification and authenticity, preventing impersonation, especially for humanoid robots. By embedding essential credentials-such as ownership, operational history, and compliance data—the system streamlines regulatory adherence and ensures readiness for operation in specific regions. The system facilitates robust access control, granting or restricting robot access to geographical regions based on permissions. Real-time monitoring capabilities provide continuous updates on robot status, location, and activities, enhancing security and operational oversight. Advanced encryption and tamper-proof measures protect sensitive data within the passport, ensuring its security and integrity.

Figure 1:
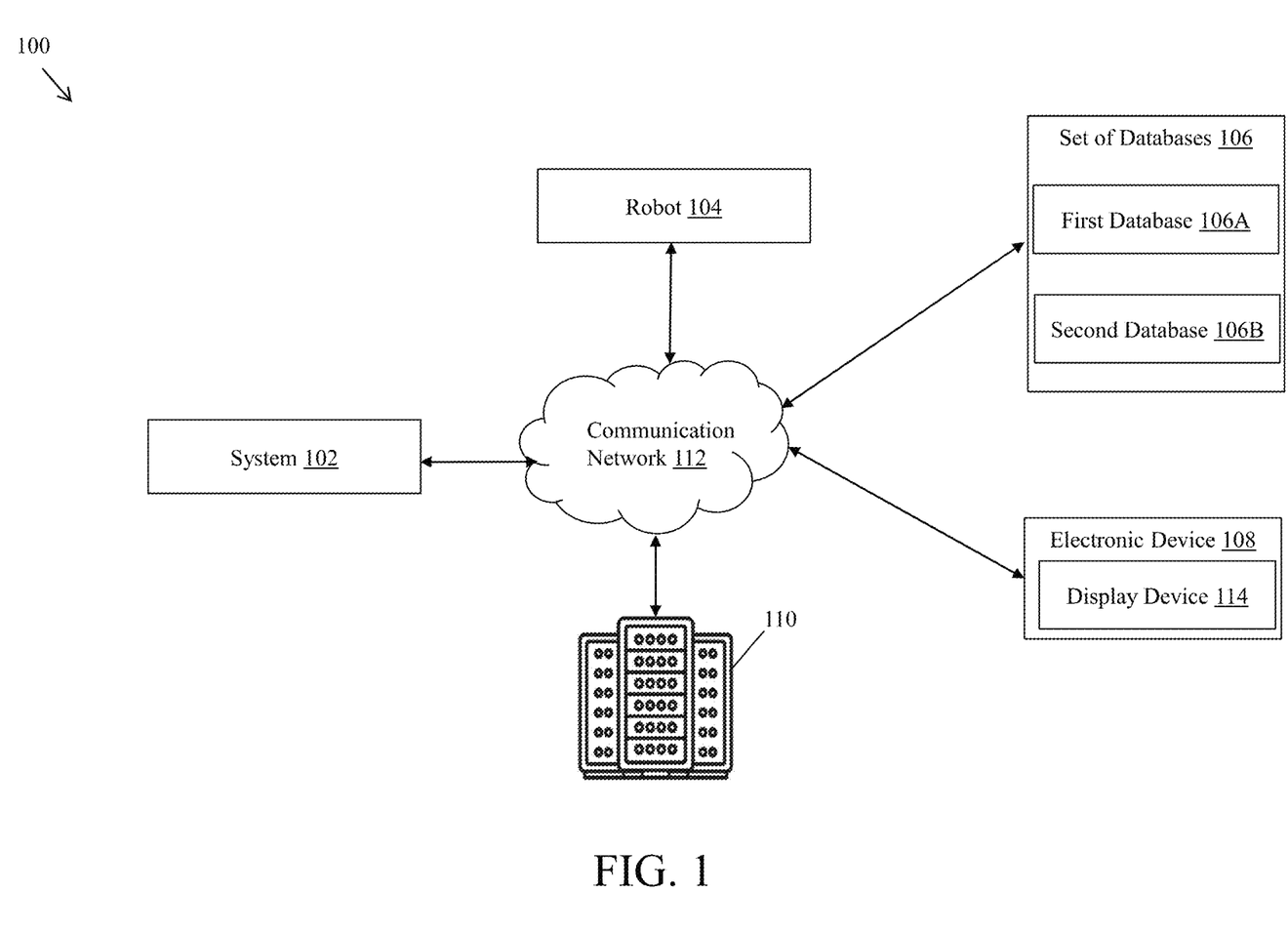
FIG. 1 is a block diagram that illustrates an exemplary environment for verification and authentication of robots, in accordance with an embodiment of the disclosure.

FIG. 1 is a block diagram that illustrates an exemplary environment for verification and authentication of robots, in accordance with an embodiment of the disclosure. Referring to FIG. 1, there is shown a network environment 100, which may include a system 102, a robot 104, a set of databases 106, an electronic device 108, a server 110, and a communication network 112.

The system 102 may comprise suitable logic, circuitry, interfaces, and/or code that may be configured to receive first identification information associated with a metallic identifier 106A of the robot 104. The system 102 may be further configured to query the set of databases 106 about the first identification information based on the reception of the first identification information. The system 102 may be further configured to generate a result based on the querying of the set of databases 106 about the first identification information. The result is indicative of a presence or an absence of the first identification information in the set of databases 106. The system 102 may be further configured to control an access of the robot 104 to enter a geographical region and to perform one or more actions within the geographical region based on regulation data associated with the geographical region and the generated result. Examples of the system 102 may include, but are not limited to, a computing device, a controller system, a server, a mainframe machine, a computer work-station, a smartphone, a cellular phone, a mobile phone, and/or a consumer electronic (CE) device.

The robot 104 may include suitable logic, circuitry, interfaces, and/or code that may be configured to interact naturally with humans, replicating human-like gestures, facial expressions, and speech. Specifically, the robot 104 may be designed to mimic human form and behavior, often equipped with features such as a head, torso, arms, and legs. Examples of different types of robots, may include a service humanoid robot, a research humanoid robot, and an entertainment humanoid robot. The service humanoid robot may focus on interacting with humans in settings such as retail or healthcare. The research humanoid robot may be developed to test robotics technologies and navigate complex environments. The entertainment humanoid robot may be created to perform engaging activities, such as dance or storytelling, often used in theme parks or media.

In an embodiment, the robot 104 may have a unique identifier (also referred to as a fingerprint) that may be tied to its functional components, ensuring authenticity. In an embodiment, the unique identifier may be made up of a metal and therefore may also be referred to as a metal fingerprint. The metal fingerprint acts as a permanent, tamperproof identifier that is linked directly to the robot's core hardware, including the central processing unit (CPU), memory, and other essential parts. In an embodiment, the metal fingerprint is a unique two-dimensional or a three-dimensional (2D or 3D) physical pattern embedded in the structure of the robot 104. During the manufacturing of the robot, the metal fingerprint pattern may be scanned and translated into a digital code (also referred to as identification information or fingerprint code) using advanced imaging and encoding algorithms. This fingerprint code is a digital representation of the physical fingerprint.

As discussed above, the identification information may be hardcoded into the robot's hardware, such as its Central Processing Unit (CPU) or memory storage (e.g., ROM or SSD). This ensures the identification information is integral to the core operations of the robot 104. In an embodiment, the firmware of the robot 104 may be programmed to refer to the fingerprint code as part of its operational checks. Furthermore, the fingerprint code is registered in the first database of the set of databases 106, linked to details about the robot's model, specifications, and ownership. In an embodiment, the operating system of the robot 104 periodically cross-references the fingerprint code stored in its hardware with the physical metal fingerprint. If any discrepancy arises, the robot 104 identifies it as a potential tampering and activates a fail-safe mode. Details about the fail-safe mode are provided, for example, in FIG. 3.

In an embodiment, the identification information may be hard coded into each part of the set of parts associated with the robot 104. Specifically, the robot 104 may be made up of a set of parts (also referred to as components or spare parts) and the identification information may be hard coded on each part of the set of parts. In case someone tries to use different parts, they won't be able to because the identification information of the replaced part may not match the identification information of the other parts. Therefore, the robot 104 may be considered as a secure and fail-proof robot. In certain cases, each component within the set of parts associated with the robot 104 may be equipped with an integrated global positioning system (GPS) sensor. This integration can be particularly useful for tracking the precise location where the robot 104 may have been tampered with, altered, or replaced by malicious users. By enabling real-time monitoring, such a system enhances security, facilitates rapid detection of unauthorized modifications, and aids in forensic analysis to determine the source and nature of the interference. Additionally, GPS tracking can assist in verifying the integrity of the robot's components, ensuring compliance with operational and safety standards.

The set of databases 106 may comprise suitable logic, circuitry, interfaces, and/or code that may be configured to store the identification information associated with a set of robots (that may include the robot 104). In an embodiment, the set of databases 106 may include a first database 106A that may store the identification information associated with each robot of the set or robots, a second database 106B that may store laws, regulations, and guidelines associated with each geographical region of a set of geographical regions. In an embodiment, each database of the set of databases 106 may be updated periodically. Examples of the set of databases 106 include, but are not limited to, a relational database, an SQL database, a document database, an object-oriented database, a hierarchical database, or a distributed database.

The electronic device 108 may include suitable logic, circuitry, interfaces, and/or code that may be configured to receive one or more notifications from the system 202. The electronic device 108 may be further configured to render the received one or more notifications on a display device 114. In an embodiment, the electronic device may be associated with an entity that may be the manufacturer or the owner of the robot 104. Examples of the electronic device 108 may include, but are not limited to, a smartphone, a cellular phone, a mobile phone, a personal digital assistant (PDA) device, a tablet, a gaming device, a computing device, a mainframe machine, a server, a computer workstation, a Head-Mounted Display (HMD), a Mobile VR Headset, an Augmented Reality (AR) Headset, a Mixed Reality (MR) Headset, and/or a consumer electronic (CE) device.

The server 110 may include suitable logic, circuitry, interfaces, and/or code that may be configured to store the identification information of each robot of the set of robots, and the regulation data associated with the geographical region. The server 110 may be configured to communicate with the system 102, the set of databases 106, the robot 104, and the electronic device 108 via the communication network 112. Examples of the server 110 may include, but are not limited to, an application server, a cloud server, a web server, a database server, a file server, a mainframe server, or a combination thereof.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the system 102 as two separate entities. In certain embodiments, the functionalities of the server 110 can be incorporated in its entirety or at least partially in the system 102, without a departure from the scope of the disclosure.

The communication network 112 may include a medium through which the system 102 may communicate with the set of databases 106, the robot 104, the electronic device 108, or the server 110. Examples of the communication network 112 may include, but are not limited to, the Internet, a cloud network, a Long-Term Evolution (LTE) network, a Wireless Local Area Network (WLAN), a Local Area Network (LAN), a telephone line (POTS), or other wired or wireless network. Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), a device to device communication, cellular communication protocols, or Bluetooth (BT) communication protocols, or a combination thereof.

The display device 114 may include suitable logic, circuitry, and interfaces that may be configured to display the one or more notifications. The display device 114 may be a touch screen which may enable a user to provide a user-input via the display device 114. The touch screen may be at least one of a resistive touch screen, a capacitive touch screen, or a thermal touch screen. The display device 114 may refer to a display screen of a head-mounted device (HMD), a smart-glass device, a see-through display, a projection-based display, an electro-chromic display, or a transparent display. In accordance with an embodiment, the display device 114 may be realized through several known technologies such as, but not limited to, at least one of a Liquid Crystal Display (LCD) display, a Light Emitting Diode (LED) display, a plasma display, or an Organic LED (OLED) display technology, or other display devices.

In operation, the system 102 may be configured to receive the first identification information associated with the metallic identifier of the robot 104. As discussed above, the metallic identifier may correspond to a fingerprint of the robot 104 and may be made up of metal (such as Aluminum, steel, titanium, copper, brass, and the like). The system 102 may be further configured to query the set of databases 106 about the first identification information based on the reception of the first identification information. Specifically, the system 102 may be further configured to query the first database 106A of the set of databases 106 about the first identification information based on the reception of the first identification information.

The system 102 may be further configured to generate a result based on the querying of the set of databases 106 about the first identification information. The result may be indicative of the presence or the absence of the first identification information in the set of databases 106. Based on the generated result, the system 102 may be configured to control an access of the robot 104 to enter the geographical region. Specifically, if the result indicates the presence of the first identification information in the first database of the set of databases 106, then the system 102 may allow the robot 104 to enter the geographical region. Otherwise, if the result indicates the absence of the first identification information in the first database of the set of databases 106, then the system 102 may restrict the robot from entering the geographical region.

Figure 2:
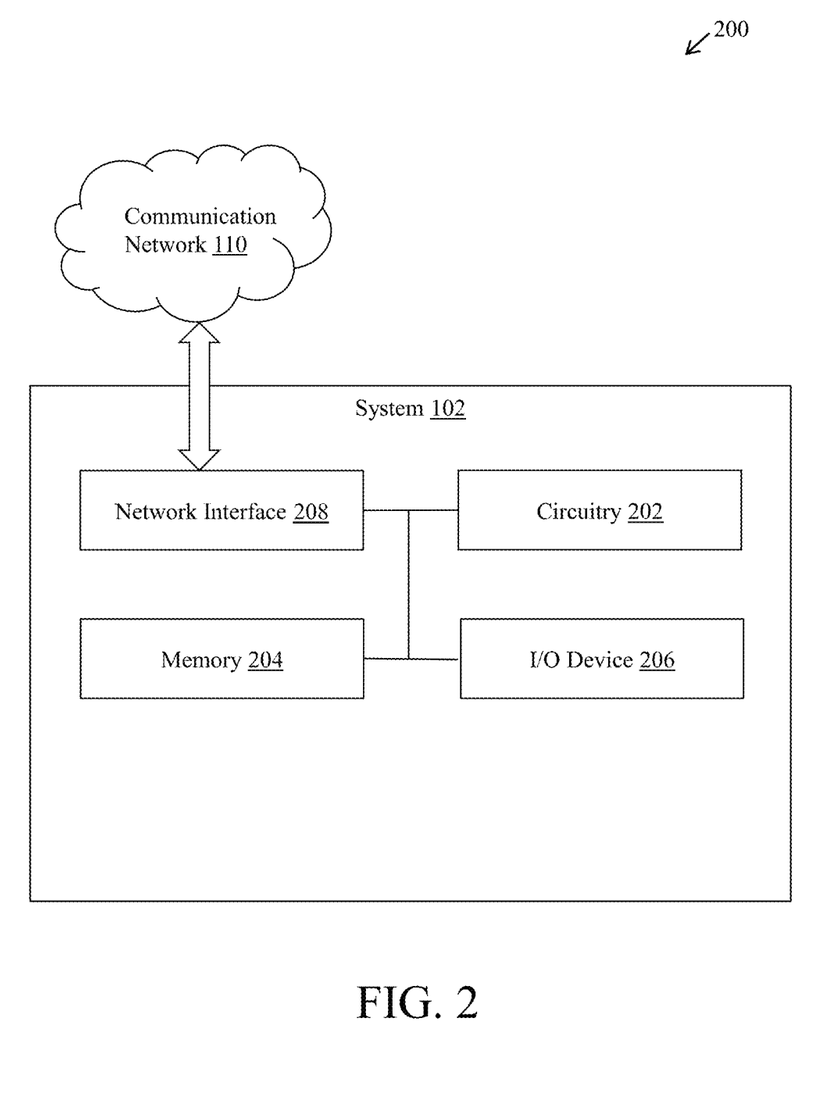
FIG. 2 is a block diagram that illustrates an exemplary system for verification and authentication of robots, in accordance with an embodiment of the disclosure.

FIG. 2 is a block diagram that illustrates an exemplary system for verification and authentication of robots, in accordance with an embodiment of the disclosure. FIG. 2 is explained in conjunction with elements from FIG. 1. With reference to FIG. 2, there is shown a block diagram 200 of the system 102. The system 102 may include a circuitry 202, a memory 204, an input/output (I/O) device 206, and a network interface 208. The circuitry 202 may be communicatively coupled to the memory 204, the I/O device 206, and the network interface 208.

The circuitry 202 may include suitable logic, circuitry, and interfaces that may be configured to execute program instructions associated with different operations to be executed by the system 102. For example, some of the operations may include, but not limited to, receiving the first identification information, querying the set of databases 106, generating the result, and controlling the access of the robot 104. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. In at least one embodiment, the memory 204 may store the first identification information and the set of databases. The memory 204 may also store the regulation data. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive one or more user inputs and provide an output. For example, the system 102 may receive the user input via the I/O device 206. The I/O device 206 which includes various input and output devices, may be configured to communicate with the circuitry 202. Examples of the I/O device 206 may include, but are not limited to, a touch screen, a keyboard, a mouse, a joystick, a microphone, a display device (such as the display device 114), and a speaker.

The network interface 208 may include suitable logic, circuitry, and interfaces that may be configured to facilitate a communication between the circuitry 202, the set of databases 106, the electronic device 108, the display device 114, and the server 110, via the communication network 112. The network interface 208 may be implemented by use of various known technologies to support wired or wireless communication of the system 102 with the communication network 112. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The functions or operations executed by the system 102, as described in FIG. 2, may be performed by the circuitry 202. Various operations executed by the circuitry 202 are described in detail, for example, in FIGS. 3, 4, 5, and 6.

Figure 3:
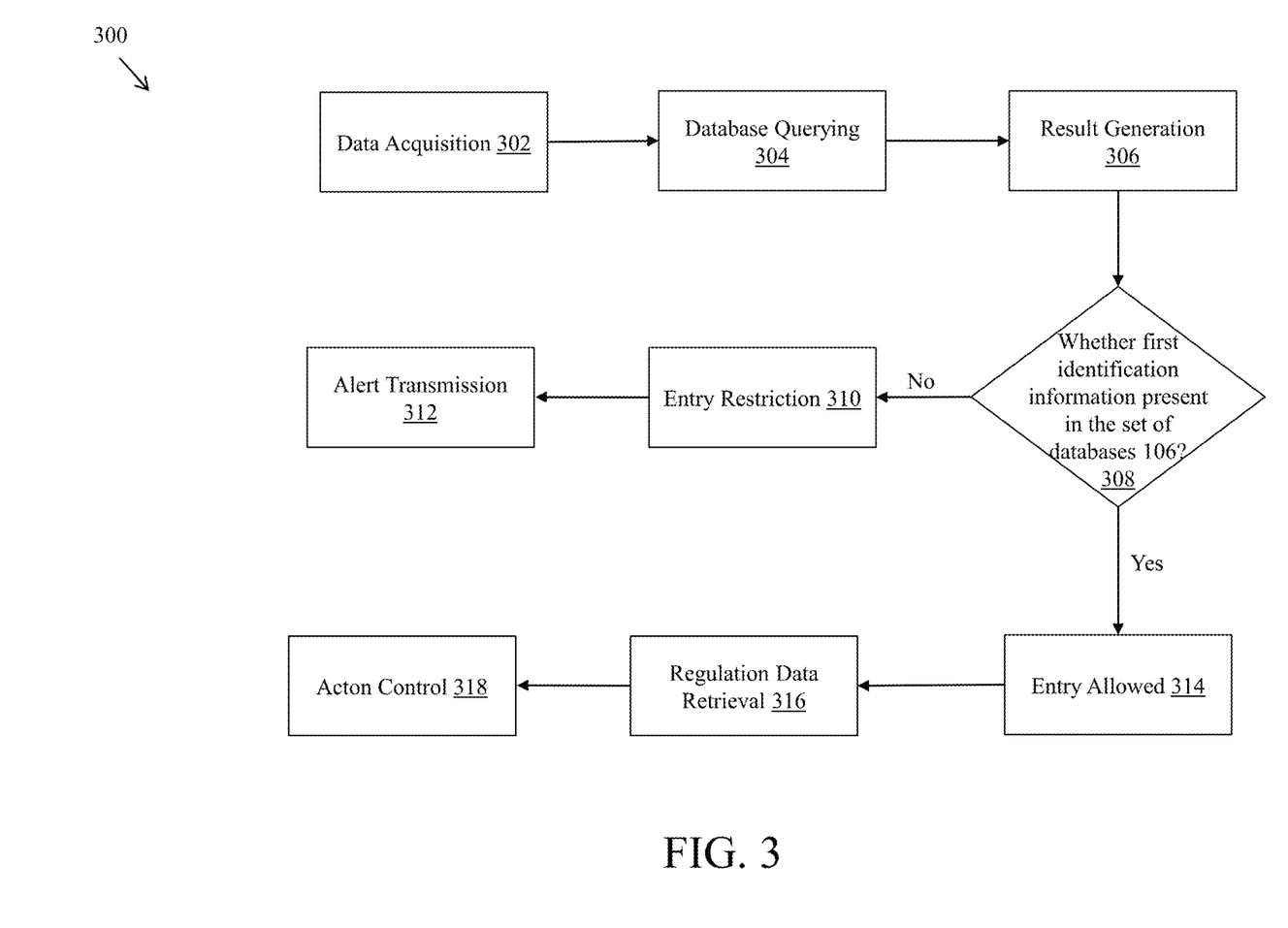
FIG. 3 is a diagram that illustrates exemplary operations for verification and authentication of robots, in accordance with an embodiment of the disclosure.

FIG. 3 is a diagram that illustrates exemplary operations for verification and authentication of robots, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 318, as described herein. The exemplary operations illustrated in the block diagram 300 may start at 302 and may be performed by any computing system, apparatus, or device, such as by the system 102 of FIG. 1 or circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

With recent advancements in the robotic technology, robots (such as the robot 104) will be able to travel from one country to another country (or from a first geographical region to another geographical region). However, at the border or at the entry-point of the destination, their identity may be checked for Identity verification, compliance with immigration laws, security measures, and the like. To verify the robot 104, the following operations may be performed.

At 302, a data acquisition operation may be performed. In data acquisition operation, the circuitry 202 may be configured to receive the first identification information associated with a metallic identifier of the robot 104. In an embodiment, the system 102 may control a blood detection device to identify an entity as the robot 104. The blood detection device (also referred to as a blood detection pen) determines whether an entity is a robot or a human by detecting the presence or absence of blood within the entity, thereby ensuring accurate classification. If blood is present, the entity is identified as human; otherwise, it is classified as a robot. Based on the identification of the entity as the robot 104, the system 102 receives the first identification information linked to a metallic identifier embedded in the robot 104. The first identification information may be received from the robot 104 or a device associated with the robot 104. In an embodiment, the robot 104 may provide the first identification information based on a request from the system 102.

In an embodiment, the metallic identifier may correspond to a fingerprint of the robot 104. The fingerprints of the robot 104 may be made up of the metal to make it tamper-proof. In an embodiment, the first identification information may correspond to a digital code associated with the metallic identifier. The digital code may be a representation where information, data, or instructions are encoded into a digital format, typically using binary (0s and 1s) as the fundamental building blocks. In an alternate embodiment, the identification information may be in a numerical or an alpha-numerical format.

In an embodiment, the identification information of the robot 104 may refer to the unique set of data used to distinguish and identify it within a system or network. The identification information typically includes a serial number, a unique robot ID, and optionally a MAC address or IP address for communication purposes. Additionally, the identification information may encompass details such as the model number, manufacturer, owner, firmware version, and hardware specifications. In some embodiments, the robot 104 may also be equipped with unique QR codes, barcodes, or RFID tags for physical identification.

In an embodiment, to ensure the uniqueness of metal fingerprints between different vendors, a central global agency or database would maintain records of all robot fingerprints. The vendors (or manufacturers) must register every robot's metal fingerprint with this agency during manufacturing. The database would use sophisticated algorithms to verify that no two fingerprints are identical, preventing duplication. Furthermore, the vendors would be required to obtain certification from the global agency, verifying that the fingerprinting process adheres to strict standards. This may ensure that all robots produced meet global identification requirements. Further, a proprietary algorithm may generate unique metal fingerprints for each robot. The algorithm would create a random, highly complex 2D/3D pattern that is nearly impossible to replicate or predict, ensuring uniqueness. Lastly, the fingerprint of each robot must be registered with the global database before it can be activated. During registration, the system cross-references the fingerprint to confirm it does not match any existing record.

To ensure that physical tampering with the metal fingerprints is detected or prevented, the metal fingerprint may be physically embedded into critical components of the robot, such as the CPU casing or control board. Any attempt to remove or replace it may damage the robot 104, rendering it inoperative. The fingerprint may be coated with a tamper-evident material that changes appearance or triggers an alert if someone attempts to alter or remove it. In an embodiment, the robot 104 could periodically cross-check its fingerprint with the registered data in the global database. Any mismatch would trigger a system lockdown, preventing the robot from functioning. In an embodiment, one or more sensors may be incorporated around the fingerprint area to detect unauthorized access or tampering attempts. If tampering is detected, the robot 104 may log the event and notify authorities. Furthermore, the robot 104 may be subject to routine inspections or audits to ensure that the fingerprints remain intact and unaltered. These audits could be conducted by authorized personnel or through automated systems at security checkpoints. By combining these measures, the system can ensure the uniqueness of metal fingerprints while safeguarding them against both digital and physical tampering.

As discussed above, the metal fingerprint is a unique 2D/3D physical pattern that may be embedded in the structure of the robot 104. During manufacturing of the robot 104, the 2D/3D physical pattern may be scanned and translated into the digital code using advanced imaging and encoding algorithms. The fingerprint code is a digital representation of the physical fingerprint. Also, the fingerprint code may be hardcoded into the hardware, such as its Central Processing Unit (CPU) or memory storage (e.g., ROM or SSD) of the robot. This may ensure that the code is integral to the core operations of the robot 104. Also, the firmware of the hardware may be programmed to reference this code as part of its operational checks. Also, the fingerprint code is registered in the set of databases 106 (also referred to as a global database), linked to details about the model, specifications, and ownership of the robot 104. In an embodiment, the operating system of the robot 104 periodically cross-references the fingerprint code stored in its hardware with the physical metal fingerprint. If any discrepancy arises, the system identifies potential tampering. In an embodiment, when the robot 104 is powered on or passes through a security checkpoint, the CPU of the robot 104 scans the metal fingerprint and verifies it against the stored fingerprint code in its hardware and the global database. The linkage ensures that the robot's identity remains consistent and authentic. The fingerprint code is a unique digital identifier derived from the metal fingerprint of the robot 104. It serves as a secure, tamper-proof reference for the identity of the robot 104. The key characteristics of the fingerprint code may be that each code is unique to a specific robot, ensuring no two robots share the same identifier. It is a numerical or alphanumeric sequence generated through specialized algorithms, based on the physical metal fingerprint. The fingerprint code cannot be altered digitally or physically without detection, as it is linked to the hardware of the robot 104 and stored in a global registry (or the set of databases 106). The fingerprint code enables functions like authentication and verification of the identity of the robot 104, monitoring compliance with regulations and ownership records, and the detection of tampering or unauthorized modifications. By linking the fingerprint code to the robot's hardware, the system ensures that each robot can be uniquely identified, authenticated, and tracked throughout the life cycle of the robot 104.

At 304, a database querying operation may be executed. In the database querying operation, the system 102 may be configured to query the set of databases 106 about the first identification information. In an embodiment, the system 102 may be configured to query the set of databases 106 about the first identification information based on the reception of the first identification information. Specifically, the system 202 may be configured to query the first database of the set of databases 106 about the presence of the first identification information in the first database of the set of databases 106. As discussed above, the first database of the set of databases 106 may be a global database where the identification information associated with all the robots may be stored. Further, along with the identification information, details about the specification, manufacturer, and owner of the all the robots, including the robot 104, may be stored in the first database of the set of databases 106.

In an embodiment, the system 102 may query the first database of the set of databases 106 using SQL (Structured Query Language), ORMs (Object-Relational Mappers), Command-Line Interface (CLI), Database Management Tools, Programmatic Access, Querying NoSQL Databases, or APIs for Remote Queries. Details about querying the first database of the set of databases 106 using SQL, ORMs, CLI, Database Management Tools, Programmatic Access, Querying NoSQL Databases, or APIs for Remote Queries are known in the art and therefore have been omitted for the sake of brevity.

At 306, a result generation operation may be executed. In the result generation operation, the system 102 may be configured to generate a result based on the querying of the set of databases 106 about the first identification information. The result is indicative of a presence or an absence of the first identification information in the set of databases 106. By way of example, if the first identification information is present in the set of databases 106, then the result may be "1". Otherwise, the result may be '0'.

At 308, it may be determined whether the first identification information is present in the set of databases 106 or not. In an embodiment, the system 102 may be configured to determine whether the first identification information is present in the set of databases 106 or not based on the generated result. By way of example, if the value of the result is '0', then it may indicate that the first identification information is not present in the set of databases 106 and the control may be transferred to 310. Otherwise, if the value of the result is '1', then it may indicate that the first identification information is present in the set of databases 106 and the control may be transferred to 314.

At 310, an entry restriction operation may be executed. In the entry restriction operation, the system 202 may control the access of the robot 104 to enter a geographical region based on the generated result. Specifically, the system 202 may restrict the entry of the robot 104 in the geographical region based on the generated result. This may be done because the robot 104 may be tampered with or unauthorized because the identification information of robot 104 may not be present in the set of databases 106.

At 312, an alert transmission operation may be executed. In the alert transmission operation, the system 202 may be configured to alert the owner of the robot 104, local authorities, and possibly its manufacturer if a compliance violation is detected. The details about the owner, the manufacturer of the robot 104, and the citizenship of the robot 104 may be extracted from an airline server associated with an airline in which the robot 104 might have traveled as such details may be required for booking the ticket to come to the geographical region. The citizenship of the robot 104 may refer to the legal or symbolic recognition of the robot 104 as a citizen of a country, granting the robot 104 certain rights, responsibilities, or status within society. In an embodiment, the citizenship of the robot 104 may require a legal framework defining rights such as property ownership or autonomy, along with responsibilities like following laws or paying taxes. At 314, an entry-allowed operation may be executed. In the entry-allowed operation, the system 202 may control the access of the robot 104 to enter the geographical region based on the generated result. Specifically, the system 202 may allow the robot 104 to enter the geographical region based on the generated result.

At 316, a regulation data retrieval operation may be executed. In the regulation data retrieval operation, the system 202 may be configured to retrieve regulation data associated with the geographical region based on the generated result. The regulation data may be indicative of laws, regulations, and guidelines associated with the geographical region. In an embodiment, the regulation data associated with the geographical region may be retrieved from the second database 106B of the set of database 106. As discussed above, the second database 106B of the set of databases 106 may store the regulation data. In an embodiment, the second database 106B may be geo-fenced, ensuring that the robot 104 adapts its behavior based on the location it is operating in. The second database 106B may be a regularly updated database to cover the latest laws, regulations, and guidelines associated with the geographical region.

In an embodiment, the system 102 may be configured to store the regulation data within the robot 104 based on the controlling of the access of the robot 104 to enter the geographical region. Specifically, the system 102 may be configured to retrieve the regulation data associated with the geographical region and store the retrieve the regulation data in the robot before providing the access to the robot 104 to enter the geographical region.

At 318, an action program operation may be executed. In the action program operation, the system 102 may be configured to program one or more actions of the robot based on the retrieved regulation data. In an embodiment, some actions (like some hand signs) may be not be allowed in geographical regions. Therefore, the system 202 may control the one or more actions to be performed by the robot 104 in the geographical region.

In an embodiment, the system 102 may be configured to detect one or more restricted actions performed by the robot within the geographical region. In an embodiment, a specialized chip may be installed within the robot 104 that may be configured to detect the one or more actions that may be performed by the robot 104. This specialized chip may be further configured to detect the one or more restricted actions performed by the robot 104 based on the regulation data and the detected one or more actions. The one or more actions may include the one or more restricted actions. The one or more restricted actions may be restricted in the geographical region. Based on the detection of the one or more restricted actions in the geographical region, the system 102 may be configured to restrict one or more operations of the robot and transmit a notification to an electronic device based on the restriction of the one or more operations of the robot 104. The electronic device may be associated with at least one the owner of the robot 104, the manufacturer of the robot 104, or local authorities.

Therefore, the disclosed passbot system ensures compliance with local laws by embedding specific regulatory and operational data into the identity and operational framework of the robot 104. Each robot's operational software may include access to a regularly updated database of local laws, regulations, and guidelines. This database is geo-fenced, ensuring that a robot adapts its behavior based on the location it is operating in. The passbot system may rely on GPS and location-based services to determine the robot's geographical region. Based on this, the robot activates protocols specific to the local laws and disables features or functionalities that may be prohibited in certain jurisdictions. Also, the robot 104 may include a compliance module that stores and enforces legal constraints. These chips actively, in real-time, monitor operations locally and ensure actions taken by the robot are within the legal frameworks of the location. In an embodiment, the regulatory authorities or manufacturers may push updates to the robot's system remotely, ensuring laws are adhered to even as they change.

In an embodiment, the robot 104 may constantly cross-reference its actions against the local legal databases and operational safety protocols. The one or more sensors and AI systems monitor operational outputs to ensure they meet the required safety standards. The fingerprint ensures that the robot 104 is authenticated and matches its registered identity and operational permissions. If tampering or reprogramming occurs, the system 102 flags the discrepancy. Before performing specific functions (e.g., crossing international borders, interacting in certain industries), the robot 204 must obtain digital clearance from regional authorities or embassies. Also, if the robot 104 encounters conflicting laws or requirements, it enters a limited operational mode, pausing actions that could potentially violate regulations. In certain embodiments, safety overrides automatically halt operations if risks to people or property are detected.

The Passbot system generates real-time alerts to the robot's owner, local authorities, and possibly its manufacturer if a compliance violation is detected. The capabilities of the robot 104 are restricted to a safe, non-intrusive mode until the compliance issue is resolved. For example, in cases of travel without appropriate permissions, the robot 104 will not be allowed to pass through checkpoints. In cases of operational safety violations, the robot 104 may shut down hazardous functionalities. In an embodiment, serious violations, such as tampering with the fingerprint, trigger notifications to relevant authorities. The robot may be impounded for further investigation. Any violations are logged in the operational history of the robot 104, and detailed reports are sent to the owner and regulatory agencies to ensure transparency and facilitate resolution. If violations stem from owner negligence or intentional misuse, penalties (fines, license revocation, or legal consequences) may be imposed, further deterring non-compliance. Therefore, the system ensures a robust framework for safe, lawful, and seamless robot operations across varied jurisdictions.

In an embodiment, the monitoring entities that monitor the robot 104 may be regulatory authorities, manufacturers, owners/operators, or global registry agencies. The regulatory authorities may be local government agencies or international bodies that monitor compliance with laws and safety regulations. The manufacturers oversee operational integrity, provide system updates, and ensure adherence to global standards. The owners/operators monitor day-to-day operations, ensuring alignment with legal and safety requirements. The global registry agency maintains a centralized database and oversees fingerprint verification, compliance, and tracking.

The robot 104 transmits operational and location data to monitoring systems via secure communication channels. The GPS-enabled monitoring ensures the robot operates only within permitted areas and adheres to regional protocols. The embedded compliance chips in the robot 104 monitor operations in real-time, comparing actions with local regulations and operational guidelines. The embedded AI system and sensors constantly assess the robot's performance, identifying deviations from safety or regulatory norms.

In an embodiment, the robot's passport, containing its unique digital code, is continuously referenced against the global registry to verify its identity and operational permission. Any system attempting to modify or bypass the passport must authenticate against the registry. The robot 104 maintains detailed logs of their activities and transmits periodic updates to monitoring systems. These logs include timestamps, location data, and operational outputs, enabling remote auditing. The monitoring entities can push updates, revoke permissions, or modify operational protocols remotely if compliance issues are identified. The robot 104 is subject to routine scans at designated checkpoints or by mobile security units within the country or region.

In an embodiment, critical components (CPU, memory, motherboard) are embedded with the metal fingerprint code. Each time the robot is activated, its system verifies that all components match the registered fingerprint in the global database. If a mismatch is detected, the system flags tampering and restricts functionality. The sensors embedded in critical components detect physical tampering or unauthorized replacement. Attempts to alter or replace parts trigger alerts and operational lockdowns. The embedded compliance chip monitors the functionality and integrity of all critical parts. Unauthorized changes are logged and flagged instantly. Upon detecting tampering, the system sends real-time alerts to the robot's owner, regulatory authorities, and the manufacturer, ensuring swift action. The robot enters a failsafe mode, restricting its operations to prevent further misuse. It remains inoperable until authorized personnel address the issue and revalidate the fingerprint. By employing these mechanisms, the Passbot system ensures comprehensive monitoring, even beyond checkpoint entry, while proactively detecting and responding to unauthorized changes.

If the fingerprint code does not match the stored identity data, the Passbot system triggers a failsafe mode in the robot, effectively disabling its primary operations. The robot 104 retains only essential safety functions, such as maintaining stability or halting hazardous activities, while preventing further unauthorized operations. The robot 104 control software halts processes that require identity verification, such as movement, data transmission, or execution of programmed tasks if the fingerprint code does not match the stored identity data. In an embodiment, the passbot system communicates with the robot remotely to initiate an operational shutdown if discrepancies are identified. This feature ensures security even if the robot is in motion or located in a sensitive area.

In an embodiment, the passbot operates on standardized, vendor-neutral protocols enforced by a global regulatory agency. These protocols ensure that all robots and authentication systems are interoperable. The robots are designed to integrate with Passbot during manufacturing, adhering to compliance standards that allow the system to monitor and control them. In an embodiment, every robot, regardless of vendor, must register its unique Botprint with the global database managed by Passbot. The system 102 validates and cross-references the fingerprint and operational data with the central registry, ensuring compliance. The vendors embed compliance chips during production that are compatible with the Passbot system. These chips act as intermediaries, allowing the system to enforce restrictions directly. The passbot is authorized to override the robot's systems remotely if a compliance breach occurs. Vendors must include a secure access mechanism in their robots to enable Passbot's control. The robot manufacturers must obtain certification from the Passbot system, ensuring compatibility and compliance with its requirements. This certification includes embedding standardized protocols and granting the system the ability to enforce operational controls. Through these mechanisms, the Passbot system ensures that it can control and monitor robots from various vendors while maintaining security, compliance, and seamless integration.

It may be noted that while the robot's metal fingerprint is generated and embedded during manufacturing, the ownership details are not finalized until the robot is sold or assigned to a specific customer. At the point of sale or distribution, the vendor registers the new owner's details (e.g., name, address, and proof of ownership) in the Passbot Global Registry (or the set of databases 106). This registration links the robot's fingerprint with the owner's identity. The manufacturer integrates the robot's unique Botprint into the Passbot system and associates it with the registered owner. This information is securely stored in the Passbot Global Database, which acts as the central repository for robot and owner identification. The Ownership is verified through secure credentials (e.g., government-issued IDs, company documentation) submitted by the buyer during the registration process. Passbot authenticates the ownership data and links it to the robot's fingerprint in its database.

When the robot 104 is sold, the new buyer must initiate an ownership transfer process through the Passbot system. The new owner submits proof of purchase and identity verification to the vendor or directly to Passbot, depending on the established process. The Passbot system updates the Global Registry with the new owner's details and links them to the robot's fingerprint. This update ensures that the robot's operational permissions and accountability are now associated with the new owner. The robot undergoes a security check during the transfer process to ensure that its components, fingerprint, and operational data are intact. Any detected discrepancies (e.g., tampering) are flagged and must be resolved before the ownership transfer is approved. The Passbot system actively tracks ownership changes and updates records in real-time. This ensures that there is no lapse in accountability and that the new owner assumes responsibility for the robot immediately.

In an embodiment, the Passbot system requires multi-factor authentication (e.g., biometric verification, secure passwords) from the new owner during registration or transfer. The Passbot system requires multi-factor authentication (e.g., biometric verification, secure passwords) from the new owner during registration or transfer. To prevent misuse during ownership changes, the robot enters a restricted operational mode until the new ownership details are verified and updated in the Passbot system. By employing these mechanisms, the Passbot system ensures accurate and seamless identification of the robot's owner, whether during manufacturing, initial registration, or subsequent ownership transfers.

Therefore, the disclosed Passbot system establishes a secure and controlled interaction between humans and robots. The primary purpose of the Passbot system is to protect humans from potential harm caused by robots and, conversely, to safeguard robots from malicious human interference. If robots are programmed with harmful intent or manipulated for unethical purposes, they could pose serious risks to people and society. The Passbot system serves as a protective mechanism to prevent misuse, unauthorized access, and fraudulent activities involving robots. Additionally, it enhances security by ensuring only verified and authenticated operations are executed, while also enabling tracking and monitoring of robot activities. This system helps maintain trust, accountability, and safety in environments where human-robot interactions are prevalent.

In an embodiment, the system 102 may control the blood detection device to identify an entity as the robot 104. The blood detection device (also referred to as a blood detection pen) determines whether an entity is a robot or a human by detecting the presence or absence of blood within the entity, thereby ensuring accurate classification. If blood is present, the entity is identified as human; otherwise, it is classified as a robot. Based on the identification of the entity as the robot 104, the system 102 receives the first identification information linked to the metallic identifier embedded in the robot 104. As discussed above, the metallic identifier serves as a unique authentication mechanism, ensuring that the robot 104 is properly identified and has not been tampered with or replaced. Together, these features provide a dual-layered verification system that prevents unauthorized access, fraud, and misuse, making it especially useful in environments where human-robot interactions need to be accurately managed for security, safety, and trust.

In an embodiment, a robot registration system similar to how vehicles are registered with a Department of Motor Vehicles (DMV) may be implemented. Each robot may be assigned a unique registration number, acting as its official identification, much like a license plate or VIN (Vehicle Identification Number) for cars. This number would be used to track ownership, operational status, and compliance with regulations. Additionally, a robot center akin to a DMV—may serve as the official authority overseeing robot registration, transfers, and inspections. The robot owners may be required to register their robots, report transfers of ownership, and possibly undergo periodic safety or functionality checks. This passbot system may help prevent the misuse of robots, track accountability, and ensure only properly registered and legally compliant robots are in operation. Such a framework may be used to enhance security, deter illegal modifications or malicious use, and provide a structured way to integrate robots into society with legal and regulatory oversight.

Figure 4:
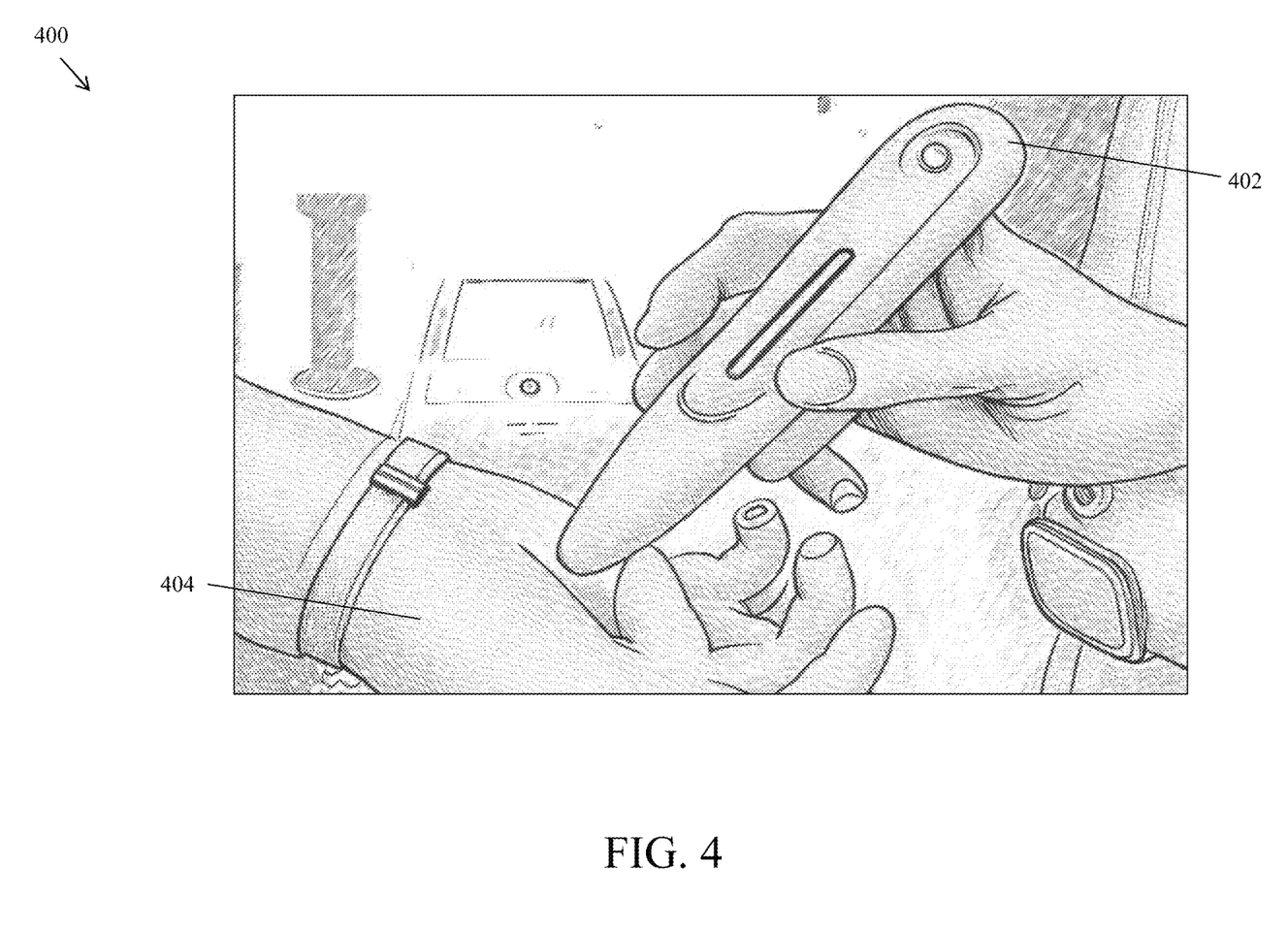
FIG. 4 is a diagram that illustrates an exemplary scenario for the determination of an entity as a robot using a blood detection device, in accordance with an embodiment of the disclosure.

FIG. 4 is a diagram that illustrates an exemplary method for the determination of an entity as a robot using a blood detection device, in accordance with an embodiment of the disclosure. FIG. 4 is explained in conjunction with elements from FIGS. 1, 2, and 3. With reference to FIG. 4, there is shown a diagram 400 that includes a blood detection device 402 and an entity 404. In an embodiment, the blood detection device 402 may be integrated within the passbot system. In an alternate embodiment, the blood detection device 402 may be a separate entity from the passbot system and may be communicatively coupled with the passbot system.

As advancements in robotics continue to progress, nowadays robots are closely resembling to humans in both appearance and behavior, making it increasingly challenging to distinguish between the robots and humans. This poses significant implications for security, law enforcement, identity verification, and ethical considerations. In response to this challenge, the disclosure provides a reliable and efficient identification method to identify biological humans and artificial robotic entities using the blood detection device 402.

When the entity 404 (a human or a robot) arrives at a destination airport, the authorities may use the blood detection device 402 as part of identity verification procedures. By quickly scanning the entity 404 at customs and immigration checkpoints, the authorities may ensure that only humans are granted access to robot-restricted areas, prevent unauthorized robots from bypassing regulations, detect robots disguising themselves as humans, and identify robots that need to be registered, inspected, or assigned specific travel permission.

The blood detection device 402 (also referred to as a blood detection pen 402) may include suitable logic, circuitry, and interfaces that may be configured to determine whether the entity 404 is a robot or a human. The blood detection device 402 operates using infrared or near-infrared sensors to penetrate infrared light in the skin of the entity 404 and analyze blood flow beneath the skin of entity 404. Specifically, the blood detection device 402 may be configured to emit infrared light based on a trigger (say when the blood detection device 402 is directed towards the skin or based on user input). The infrared light may interact with hemoglobin present in the blood and analyze the blood oxygen levels or pulse. If blood flow is detected (i.e. if the blood oxygen levels or pulse is detected), then the blood detection device 402 may determine that the entity 404 is a human. However, if blood flow is not detected, the blood detection device 402 may determine that the entity 404 is a robot.

The blood detection device 402 may be designed to be lightweight, portable, and easy to use, making it ideal for security checkpoints, access control systems, and personal identification. Unlike traditional biometric scans that rely on fingerprints or facial recognition, this disclosed technique is resistant to spoofing and ensures that robots cannot pass as humans. In some embodiments, the disclosed blood detection device 402 may be deployed in high-security areas, workplaces, transportation hubs, and even public spaces where verifying the authenticity of an individual is essential.

By providing a reliable and non-invasive means of distinguishing between humans and robots, the disclosed blood detection device 402 may be an essential tool for ensuring safety, accountability, and trust in environments where human-robot interactions are prevalent.

Figure 5:
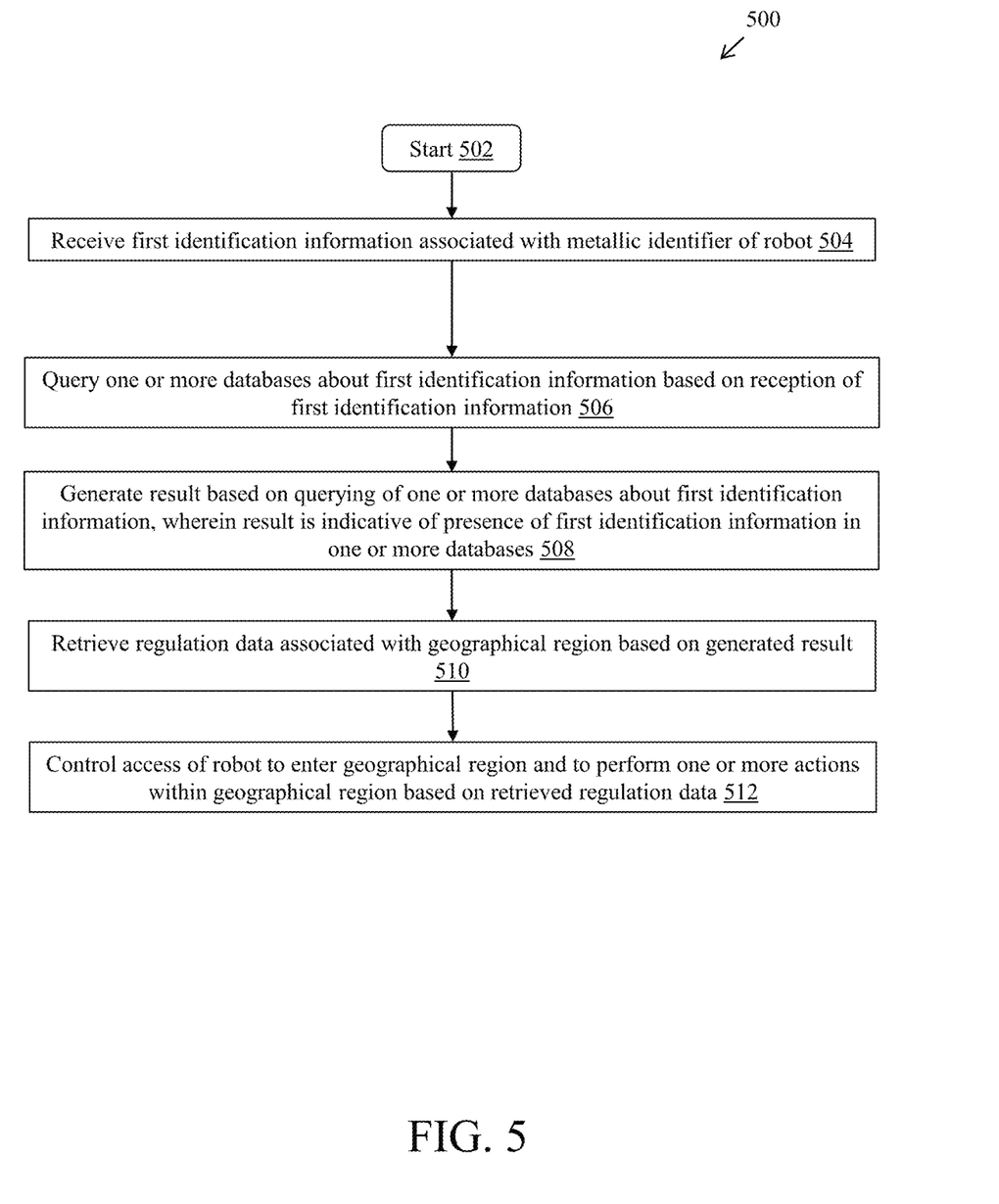
FIG. 5 is a flowchart that illustrates an exemplary method for verification and authentication of robots, in accordance with an embodiment of the disclosure.

FIG. 5 is a flowchart that illustrates an exemplary method for verification and authentication of robots, in accordance with an embodiment of the disclosure. FIG. 5 is explained in conjunction with elements from FIGS. 1, 2, 3, and 4. With reference to FIG. 5, there is shown a flowchart 500. The operations of the exemplary method may be executed by any computing system, for example, by the system 102 of FIG. 1 or the circuitry 202 of FIG. 2. The operations of the flowchart 500 may start at 502 and may proceed to 504.

At 504, the first identification information associated with the metallic identifier of the robot 104 may be received. In at least one embodiment, the circuitry 202 may receive the first identification information associated with the metallic identifier of the robot 104. Details about the reception of the metallic identifier are provided, for example, in FIGS. 1 and 3.

At 506, the set of databases 106 may be queried about the first identification information based on the reception of the first identification. In at least one embodiment, the circuitry 202 may query the set of databases 106 about the first identification information based on the reception of the first identification information. Details about the set of databases are provided, for example, in FIGS. 1 and 3.

At 508, the result may be generated based on the querying of the set of databases 106 about the first identification information. The result is indicative of a presence or an absence of the first identification information in the set of databases 106. In at least one embodiment, the circuitry 202 may generate the result based on the querying of the set of databases 106 about the first identification information, wherein the result is indicative of a presence or an absence of the first identification information in the set of databases 106. Details about the generation of result are provided, for example, in FIG. 3.

At 510, the regulation data associated with the geographical region may be retrieved. In at least one embodiment, the circuitry 202 may retrieve regulation data associated with the geographical region based on the generated result.

At 512, the access of the robot 104 to enter a geographical region and to perform one or more actions within the geographical region may be controlled based on the retrieved regulation data. In at least one embodiment, the circuitry 202 may control the access of the robot to enter the geographical region and to perform one or more actions within the geographical region based on the retrieved regulation data. Control may pass to the end.

Figure 6:
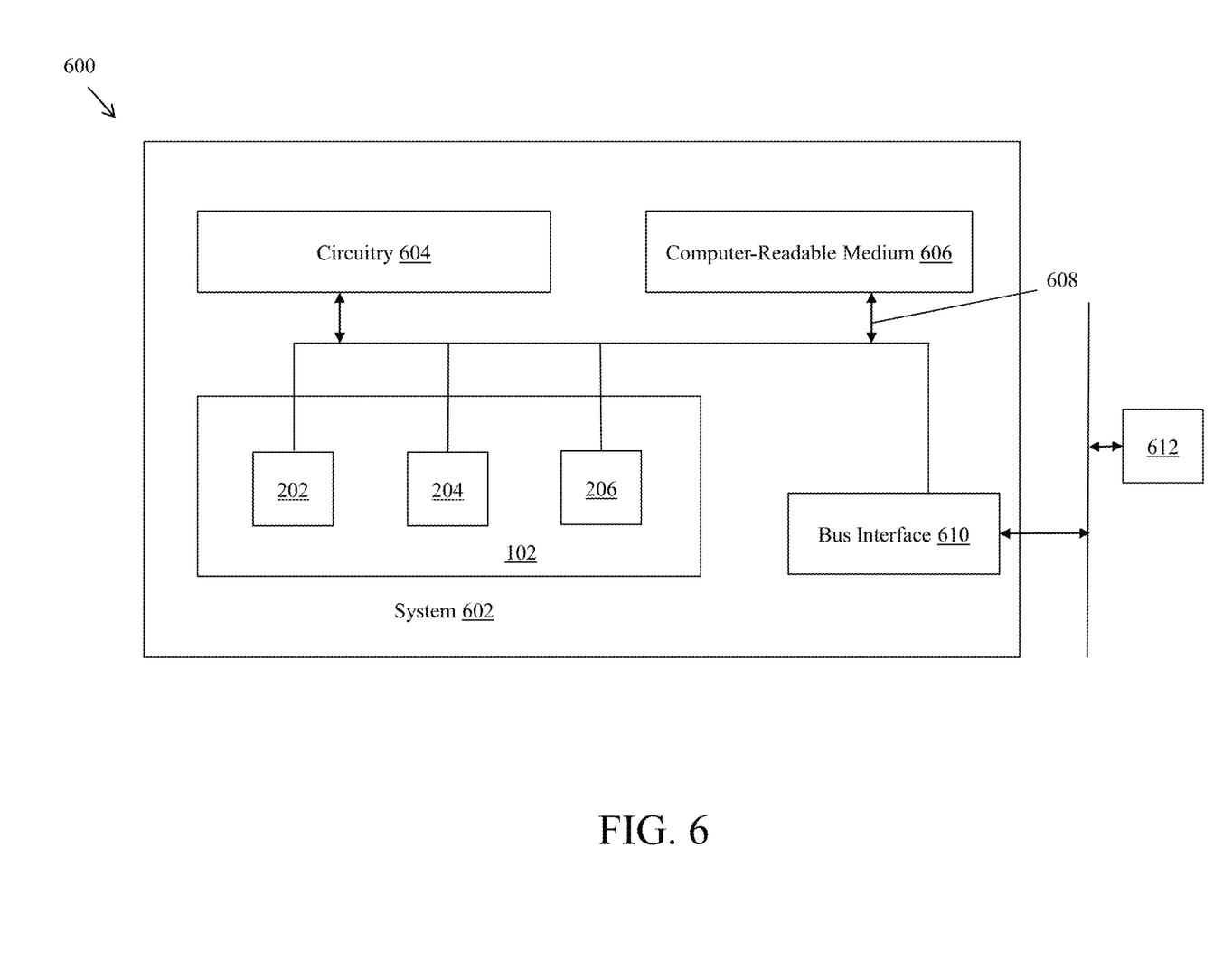
FIG. 6 is a conceptual diagram illustrating an example of a hardware implementation for a system used for verification and authentication of robots, in accordance with an embodiment of the disclosure.

FIG. 6 is a conceptual diagram illustrating an example of a hardware implementation for a system used for verification and authentication of robots, in accordance with an embodiment of the disclosure. FIG. 6 is explained in conjunction with elements from FIGS. 1, 2, 3, 4, and 5. Referring to FIG. 6, the hardware implementation shown by a representation 600 for the network environment 600 employs a processing system 602 for virtual therapy-based treatment of psychological issues, in accordance with an embodiment of the disclosure, as described herein.

In some examples, the processing system 602 may comprise a circuitry 604, a non-transitory computer-readable medium 606, a bus 608, a bus interface 610, and a transceiver 612.

The circuitry 604, such as the circuitry 202, may be configured to manage the bus 608 and general processing, including the execution of a set of instructions stored on the non-transitory computer-readable medium 606. The set of instructions, when executed by the circuitry 604, causes the system 102 to execute the various functions described herein for any particular apparatus. The circuitry 604 may be implemented, based on a number of processor technologies known in the art. Examples of the circuitry 604 may be the RISC processor, ASIC processor, CISC processor, and/or other processors or control circuits.

The non-transitory computer-readable medium 606 may be used for storing data that is manipulated by the circuitry 604 when executing the set of instructions. The data is stored for short periods or in the presence of power.

The bus 608 may be configured to link together various circuits. In this example, the network environment 100 employing the processing system 602 and the non-transitory computer-readable medium 606 may be implemented with a bus architecture, represented generally by bus 608. The bus 608 may include any number of interconnecting buses and bridges depending on the specific implementation of the system 102 and the overall design constraints. The bus interface 610 may be configured to provide an interface between the bus 608 and other circuits, such as the transceiver 612, and external devices, such as the display device 114, and the server 110.

The transceiver 612 may be configured to provide a communication of the system 102 with various other apparatus, such as the display device 114, via a network. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as 5th generation mobile network, Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VOIP), and/or Wi-MAX.

It should be recognized that, in some embodiments of the disclosure, one or more components of FIG. 5 may include software whose corresponding code may be executed by at least one processor, for across multiple processing environments.

In an aspect of the disclosure, the circuitry 604, the non-transitory computer-readable medium 606, or a combination of both may be configured or otherwise specially programmed to execute the operations or functionality of the circuitry 202, the memory 204, the I/O device 206, and the network interface 208 or various other components described herein, as described with respect to FIGS. 1 to 6.

As utilized herein, the term "exemplary" means serving as a non-limiting example, instance, or illustration. As utilized herein, the terms "for example," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprise", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (for example, application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein for generating a novel molecular structure using a protein structure.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof.

A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

The invention claimed is:

1. A system, comprising:
a circuitry configured to:
control, a blood detection device, to identify an entity as a robot, wherein the blood detection device is configured to detect one of a presence or an absence of blood within the entity;
receive first identification information associated with a metallic identifier of the robot;
query a set of databases about the first identification information based on the reception of the first identification information;
generate a result based on the querying of the set of databases about the first identification information, wherein the result is indicative of a presence of the first identification information in the set of databases;
retrieve regulation data associated with a geographical region based on the generated result; and
control an access of the robot to enter the geographical region and to perform one or more actions within the geographical region based on the retrieved regulation data.

2. The system according to claim 1, wherein the metallic identifier corresponds to a fingerprint of the robot, and wherein the fingerprint is made up of a metal.

3. The system according to claim 1, wherein the first identification information corresponds to a digital code associated with the metallic identifier.

4. The system according to claim 1, wherein the metallic identifier is indicative of at least one of: a manufacturer of the robot, an owner of the robot, or a citizenship of the robot.

5. The system according to claim 1, wherein the circuitry is further configured to: retrieve, from the set of databases, the regulation data associated with the geographical region based on the generated result; and
control the one or more actions of the robot based on the retrieved regulation data.

6. The system according to claim 5, wherein the circuitry is further configured to:
detect one or more restricted actions performed by the robot within the geographical region, wherein the one or more actions comprises the one or more restricted actions;
restrict one or more operations of the robot based on the detection of the one or more restricted actions performed by the robot within the geographical region; and
transmit a notification to an electronic device based on the restriction of the one or more operations of the robot.

7. The system according to claim 1, wherein the circuitry is further configured to:
receive an input associated with a transfer of an ownership of the robot from a first entity to a second entity;
modify the first identification information based on the reception of the input; and
update the first identification information associated with the metallic identifier of the robot in the set of databases based on the modification of the first identification information.

8. The system according to claim 1, wherein the control of the access of the robot corresponds to one of: allowing the robot to enter the geographical region or restricting the robot from entering the geographical region.

9. The system according to claim 1, wherein the robot is further configured to:
compare the first identification information with second identification information associated with the metallic identifier of the robot;
determine the first identification information is different from the second identification information; and
trigger a fail-safe mode within the robot based on the determination that the first identification information is different from the second identification information.

10. The system according to claim 1, wherein the first identification information is associated with each part of a set of parts associated with the robot.

11. The system according to claim 1, wherein a global positioning sensor (GPS) is integrated with each part of a set of parts associated with the robot.

12. The system according to claim 1, wherein a unique identifier is associated with the robot.

13. A method comprising:
controlling a blood detection device, to identify an entity as a robot, wherein the blood detection device is configured to detect one of a presence or an absence of blood within the entity:
receiving first identification information associated with a metallic identifier of a robot;
querying a set of databases about the first identification information based on the reception of the first identification information;
generating a result based on the querying of the set of databases about the first identification information, wherein the result is indicative of a presence of the first identification information in the set of databases;
retrieving regulation data associated with a geographical region based on the generated result; and
controlling an access of the robot to enter the geographical region and to perform one or more actions within the geographical region based on the retrieved regulation data.

14. The method according to claim 13, wherein the metallic identifier corresponds to a fingerprint of the robot, and wherein the fingerprint is made up of a metal.

15. The method according to claim 13, wherein the first identification information corresponds to a digital code associated with the metallic identifier.

16. The method according to claim 13, wherein the metallic identifier is indicative of at least one of: a manufacturer of the robot, an owner of the robot, or a citizenship of the robot.

17. The method according to claim 13, further comprising:

retrieving, from the set of databases, regulation data associated with the geographical region based on the generated result, wherein the regulation data is retrieved from the set of databases; and controlling the one or more actions of the robot based on the retrieved regulation data.

18. The method according to claim 17, further comprising:

detecting one or more restricted actions performed by the robot within the geographical region, wherein the one or more actions comprises the one or more restricted actions;

restricting one or more operations of the robot based on the detection of the one or more restricted actions performed by the robot within the geographical region; and transmitting a notification to an electronic device based on the restriction of the one or more operations of the robot.

19. A non-transitory computer-readable medium including computer program instructions, which when executed by a system, cause the system to perform one or more operations comprising:

controlling a blood detection device, to identify an entity as the robot, wherein the blood detection device is configured to detect one of a presence or absence of blood within the entity;

receiving first identification information associated with a metallic identifier of the robot;

querying a set of databases about the first identification information based on the reception of the first identification information;

generating a result based on the querying of the set of databases about the first identification information, wherein the result is indicative of a presence of the first identification information in the set of databases;

retrieving regulation data associated with a geographical region based on the generated result; and controlling an access of the robot to enter the geographical region and to perform one or more actions within the geographical region based on the retrieved regulation data.

* * * * *